United States Patent Office 2,786,878
Patented Mar. 26, 1957

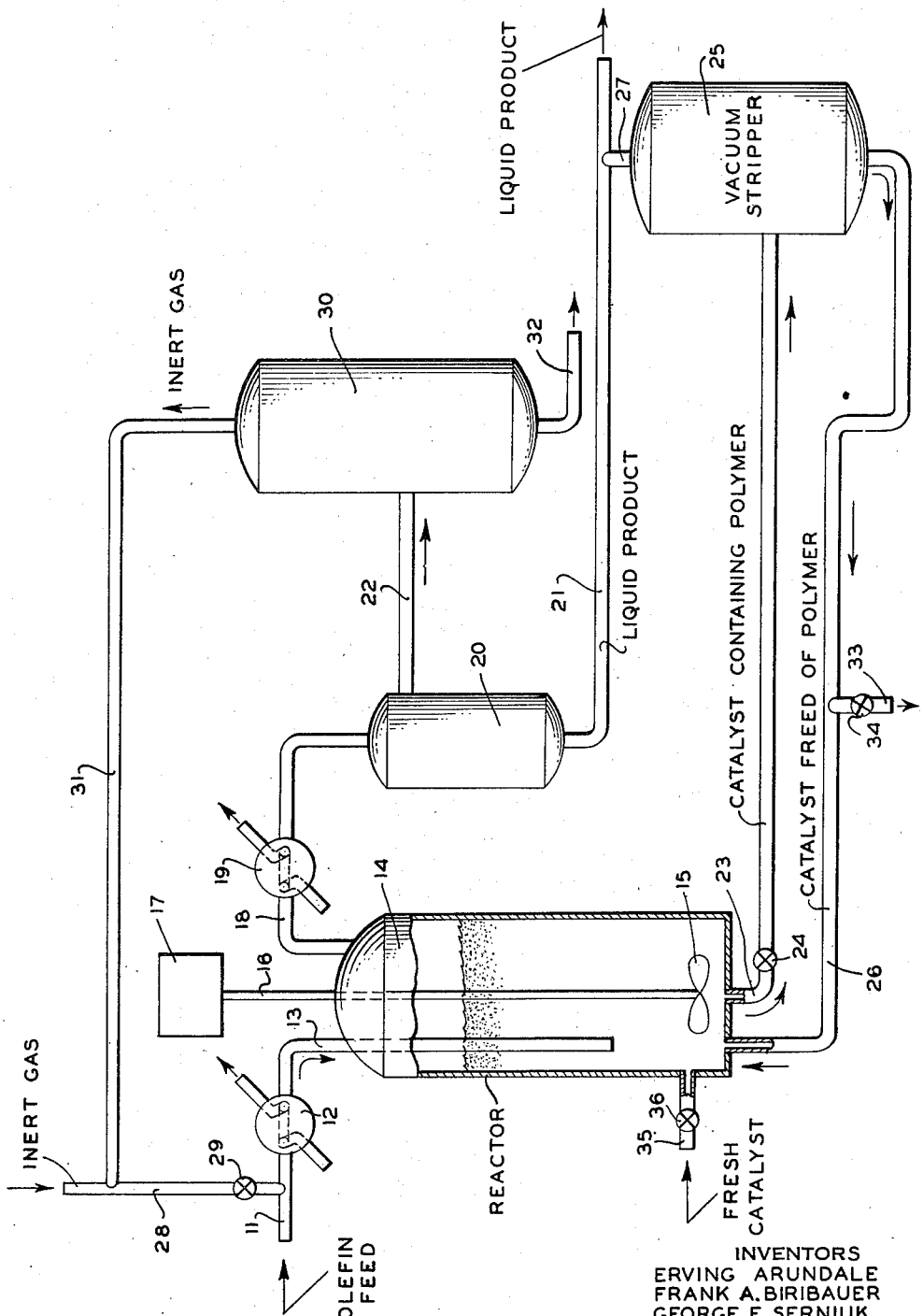

2,786,878

OLEFIN POLYMERIZATION PROCESS

Erving Arundale, Westfield, George E. Serniuk, Roselle, and Frank A. Biribauer, Cranford, N. J., assignors to Esso Research and Engineering Company, a corporation of Delaware Application June 8, 1954, Serial No. 435,228

11 Claims. (Cl. 260—683.15)

This invention is directed to the polymerization of olefinic hydrocarbons. It particularly relates to an olefin polymerization process using a catalyst comprising a mixture of an organic aromatic ester of an acid of phosphorus and an acid of phosphorus. The invention especially contemplates various processing improvements in conducting an operation of the type described.

In copending application, Serial No. 249,194, filed October 1, 1951, now U. S. Patent No. 2,758,143, in the names of Erving Arundale and Byron M. Vanderbilt, a polymerization process is disclosed and claimed in which a catalyst mixture comprising an acid of phosphorus and an organic aromatic phosphate compound is employed to polymerize olefins. This catalyst is considerably more active than either the phosphoric acid or the organic aromatic phosphate compound when used alone, and the catalyst system is particularly advantageous for use at low pressures such as from atmospheric pressure to 80 p. s. i. g. Particularly useful catalyst combinations consist of a mixture of 100% phosphoric acid and a triaryl phosphate such as tricresyl phosphate. Such catalysts are employed in the liquid state under polymerization conditions.

It has been found that this process has one disadvantage not normally encountered in other types of phosphoric acid polymerization operations; i. e., the tendency of some hydrocarbons, chiefly the higher boiling fractions of the polymer formed during the polymerization process, eventually to contaminate the catalyst. It is not known whether the free hydrocarbons (i. e., hydrocarbons not chemically combined as ester groups in the catalyst) are merely soluble in the catalyst or form a loose molecular complex with it. After extended periods of operation, the concentration of the higher boiling hydrocarbons in the catalyst gradually increases, and these hydrocarbons do not separate readily therefrom in the reaction zone under normal polymerization conditions. This lowers the activity of the catalyst and the yield of the desired product. It is the chief object of the present invention to provide means for minimizing this difficulty, thereby extending the useful life of the catalyst and improving the yield of useful product.

In accordance with the present invention, the yield of desired product is increased, the useful life of the catalyst is extended, and catalyst activity is retained at a high level by maintaining the concentration of free, high boiling hydrocarbons which accumulate in the catalyst layer at a relatively low level such as below about 20% based on the total catalyst. Under these conditions the hydrocarbons do not adversely affect catalyst activity. Preferably, a catalyst substantially free of high boiling hydrocarbons, i. e., below about 10 weight percent based on the total catalyst mixture, preferably below 5 weight percent, is maintained in the reaction zone during the entire polymerization operation.

This objective may be achieved by preventing the hydrocarbons from remaining in the catalyst or by removing at least a substantial portion of the contaminating hydrocarbons from the catalyst in the reaction zone during the polymerization step. A number of procedures may be used. For example, after the polymerization run has continued for a time sufficient to cause contamination of the catalyst, some of the contaminated catalyst may be removed from the reaction zone from time to time and be replaced with fresh, uncontaminated catalyst, or a portion of the contaminated catalyst may be continuously removed from the zone and be continuously replaced by fresh catalyst to keep contaminants at a constant level. These modes are generally undesirable, however, if used as the sole means of activity control, because they involve discarding substantial amounts of valuable catalyst that otherwise are still potentially useful.

It has been discovered that contacting the contaminated catalyst with inert fluids at elevated temperature, such as by the maintenance of free inert gas in the reaction zone in intimate contact with the catalyst during at least a portion of the polymerization step, prevents the build-up of contaminating hydrocarbons associated with the catalyst. It is possible by this procedure to prevent substantial catalyst contamination for long periods of time without resorting to the necessity of discarding excessive amounts of expensive catalyst.

Another procedure useful in attaining this objective is that of periodically or continuously removing a portion of the contaminated catalyst from the reaction zone, treating the catalyst to separate all or a substantial amount of the contaminating hydrocarbons from the catalyst, and returning the treated catalyst to the reaction zone. A preferred mode for contaminant removal is that of heat-treating the spent catalyst under conditions causing phase separation or vaporization of the hydrocarbons, such as at temperatures of from about 150° to 550° F. Thus, heating the catalyst, especially at sub-atmospheric pressures, will cause the hydrocarbons to be distilled therefrom without decomposition of the catalyst and without substantial degradation of the hydrocarbons therein. Other methods that may be used for removing hydrocarbons from the catalyst include solvent extraction with a selective solvent, generally at elevated temperatures, extractive distillation, blowing the catalyst with inert gas at elevated temperature to cause separation of hydrocarbon, etc.

Even though one of the above-described procedures may be used for maintaining catalyst activity at a desired level, it may be preferred to employ a combination of two or more of such methods in order to obtain maximum benefits.

In another aspect of this invention, it has been found that a catalyst of superior activity is formed by using a mixture of an acid of phosphorus and tricresyl phosphates that is substantially free of the orthocresyl phosphate isomer. Preferably a mixture of the meta- and para-tricresyl phosphates and phosphoric acid, is employed as catalyst.

The single figure presents a flow diagram of a preferred embodiment for conducting the process of the present invention.

Referring to the drawing, the C4 olefin-containing feed is passed through line 11 and heater 12 wherein the temperature is raised to a desired level. The heated feed is removed from the heating zone and passed by means of pipe 13 into the lower portion of reactor zone 14. The reactor 14 contains a mixture of an inorganic acid of phosphorus and an organic aromatic phosphate, which is heated to the required polymerization temperature. To maintain intimate contact between the olefin and catalyst in the reaction zone, a stirrer 15 actuated by shaft 16 and prime mover 17 is provided. The catalyst in this embodiment is in the form of a liquid and is emulsified with non-vaporous hydrocarbons.

If desired, reaction zone 14 may be packed with an inert material such as porcelain, carbon or the like to improve intimacy of contact. The catalyst mixture is maintained at a temperature sufficient to cause polymerization of the olefin but below the normal boiling point of the constituents of the catalyst mixture. Unreacted gas and polymer are removed from zone 14 by means of line 18 and are passed through a cooler-condenser 19 and thence are introduced into a primary separation zone 20 for separation of polymer product, passing through line 21, and gaseous materials, passing through line 22.

As the reaction proceeds and high molecular weight hydrocarbons become associated with the liquid catalyst in the lower portion of reactor 14, a portion of the catalyst may be removed continuously or intermittently from the zone through line 23 containing valve 24 and charged into a vacuum stripping zone 25. Stripper 25 may be a conventional reduced pressure distillation system operating under conditions such that the polymer may be stripped from the catalyst without degradation or decomposition of either the catalyst or hydrocarbons. Normally, this distillation column may be operated at a pressure below about 150 mm. mercury and preferably in the range of about 5–20 mm. mercury at such a temperature to remove everything having a normal boiling point below about 525° F. The temperature of the catalyst-hydrocarbon mixture being vacuum stripped should be kept below about 400° F. to avoid catalyst and hydrocarbon degradation. The substantially polymer-free catalyst is withdrawn from the bottom of zone 25 and is returned by means of line 26 to the catalyst layer in zone 14. The stripped hydrocarbon is removed from the top of zone 25 through line 27 and preferably is combined with the liquid polymer recovered from separation zone 20. The combined hydrocarbon streams may then be conducted to a suitable distillation zone (not shown) for separation of $C_4$ and lighter gases and for the recovery of $C_5$ and heavier polymers which may likewise be fractionated into narrow boiling point fractions if desired.

In a preferred embodiment, the olefin feed charged through line 11 has added to it a substantial excess of an inert gas that is not condensible under the conditions employed in the polymerization zone. Such gases include methane, ethane, nitrogen, hydrogen, CO, $CO_2$ or the like. In the embodiment shown, the inert gas is charged through line 28 and valve 29 in mixture with the olefin feed, and the mixture is then passed through heater 12 and subsequently into reaction zone 14. The inert gas is intimately mixed with the catalyst and reactants by agitator 15 and serves to facilitate catalyst-hydrocarbon separation as mentioned above. If desired, the inert gas may be introduced as a separate stream into the reaction zone, in admixture with the catalyst, or by other suitable means. The inert gas along with the reacted and unreacted hydrocarbons is removed from zone 14 through line 18 in the manner heretofore described. The gaseous materials recovered in separation zone 20 may be passed by line 22 into a secondary separation zone 30 wherein inert gases may be removed by means of line 31 and recycled to the reaction zone. Unreacted olefins and condensible gases may be recovered from zone 30 by means of line 32 and can be discarded or can be recycled to the reaction zone as desired.

The amount of inert gas added to the olefin feed will vary depending on the type of catalyst employed and the tendency of the polymer to remain in the catalyst. Generally, in the range of about 5 to 50 weight percent of non-condensible inerts, based on the hydrocarbon feed to the polymerization zone, will be sufficient to maintain the polymer content of the catalyst at a low level.

From time to time, as the catalyst in the system becomes gradually inactivated through degradation or through contamination, a portion of the recycled catalyst may also be withdrawn from line 26 through line 33 and valve 34. Make-up fresh catalyst may be added to the reactor through line 35 and valve 36 in order to keep a constant inventory of catalyst in the system.

The catalyst mixture of the present invention may be prepared by mixing any suitable inorganic acid of phosphorus with a polar organic compound which is inert under the polymerization conditions, specifically an organic aromatic phosphate or phosphite. Mixing is carried out quite efficiently using a high speed agitator although other means, for example, recycle pumping, can be employed in the preparation of the catalyst mixture. Useful acids of phosphorus include ortho phosphorus acid, ortho-, pyro-, meta-, and hypo-phosphoric acids and the like. Especially useful are those acids having a strength of about 90–110% and preferably about 100%.

The organic esters used in accordance with the present invention comprise the mono-, di- or tri-hydrocarbon substituted phosphates and phosphites or mixtures thereof, which esters contain at least one aromatic substituent group. Useful phosphates, for example, have the following general formula:

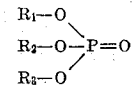

wherein $R_1$ represents an aryl, or alkaryl radical containing 6–18 carbon atoms and wherein $R_2$ and $R_3$ represent alkyl, aryl, aralkyl or alkaryl, or other hydrocarbon radicals containing 1–18 carbon atoms or hydrogen atoms. Preferred compounds are the tri-aryl phosphates, wherein $R_1$, $R_2$ and $R_3$ contain from about 6 to 10 carbon atoms in the group. It is also preferred that the aryl groups contain from 1 to 3 alkyl groups wherein each alkyl group contains from 1 to 4 carbon atoms in the group.

The neutral organic phosphates may be prepared by any suitable procedure, as for example, by the reaction of phenol or alkylated phenols with phosphorus oxychloride. Phosphorus pentoxide may be employed for preparing the acid phosphate esters. As pointed out for the purpose of this invention, the mono-, di- or tri-aryl phosphates are particularly preferred although other high boiling polar compounds such as the aryl phosphites may also be used. A particularly useful catalytic mixture comprises one prepared by reacting a phenol or petroleum phenols with phosphorus oxychloride in the molar ratio of 3 to 1 to form tri-aryl phosphates. Use of less than 3 moles of the phenol followed by hydrolysis gives at least some di- and mono-aryl phosphates. The by-product hydrogen chloride is removed in either case, and 95–105% phosphoric acid is added. Olefin feed is then added and the catalyst is allowed to come to equilibrium at the polymerization temperature. Some alkylation of the aromatic groups may occur.

Organic phosphates which may be employed in the catalyst mixture include the mono-, di- or tri-esters of phenol, cresol, xylenol, tri-methyl phenol, tri-propyl phenol or other alkylated phenols which esters can be prepared as described above or secured from other sources.

The catalyst mixture or emulsion will generally comprise in the range of about 35–70% by volume of the aromatic phosphate with the remainder being phosphoric acid. Preferred compositions contain about 50–65% of the organic ester and 50 to 35% of phosphoric acid.

The polymerization process of the present invention is particularly applicable to hydrocarbon feeds containing $C_3$ and $C_4$ olefins by themselves, mixtures thereof, or diluted with $C_3$ and $C_4$ paraffin hydrocarbons, which hydrocarbon mixtures can be produced in thermal or catalytic cracking operations employing petroleum oil feeds. The polymers produced, utilizing the present catalyst, possess high octane numbers in the range of 96–97 Research clear and can be blended with other refinery products to produce motor or aviation gasolines. These polymers are also valuable as chemical raw materials in that they can be reacted, for example, with carbon monoxide and hydrogen to form alcohols, or with aromatic hydrocarbons to form detergent alkylates and the like.

The polymerization operation is preferably carried out by contacting an olefin-containing hydrocarbon feed with an acid of phosphorus-organic aromatic phosphate catalyst in any suitable manner at a polymerization temperature, below the decomposition temperature of the catalyst, such as, between about 200–430° F., preferably at a temperature between about 250–300° F., and at a pressure between atmospheric and 1000 p. s. i. g., particularly from atmospheric to 100 p. s. i. g. The olefin-containing feed is contacted with the catalyst at such a rate as to insure high olefin conversions with feed rates ranging from about 0.1 to 2.0 volumes, and preferably 0.25–0.5 volume, of liquid olefin per volume of catalyst mixture per hour. In order to secure intimate contact between the feed and catalyst mixture, suitable emulsifying or dispersing agents, in a concentration between 0.5–5 weight percent, based on the catalyst mixture, may be added to the catalyst. A controlled amount of water may be introduced with the feed if desired, in order to maintain the concentration of phosphorus pentoxide in the catalyst at a constant level. The catalyst may also comprise small amounts of promotors, activators, etc.

The following examples will illustrate preferred methods for carrying out the practice of the present invention.

EXAMPLE 1

A series of olefin polymerization operations were carried out employing a $C_3$ to $C_4$ olefin feed containing 56.5% by weight of olefins. This feed had the following composition:

| Component: | Weight percent |
|---|---|
| $C_2H_6$ | 1.9 |
| $C_3H_8$ | 9.6 |
| $C_3H_6$ | 19.4 |
| n-$C_4H_{10}$ | 7.1 |
| i-$C_4H_{10}$ | 24.7 |
| $C_4H_8$ | 37.0 |
| $C_5H_{12}$ | 0.2 |
| $C_5H_{10}$ | 0.1 |

The runs were conducted in a stirred reactor similar to the type described in connection with the above figure using a stirrer operating at 900 R. P. M. The olefin feed was charged at a rate of 0.25 liquid volumes of feed per volume of catalyst per hour. In each run, the reactor temperature was maintained at 295–300° F., and the reaction pressure was maintained in a range of 780 to 800 mm. mercury, absolute. In each run, the catalyst consisted of a mixture of one volume of 100% $H_3PO_4$ and one volume of tricresyl phosphate. In one run, the tricresyl phosphate consisted of a mixture of meta and para tricresyl phosphates. In another run, the tricresyl phosphate consisted entirely of ortho tricresyl phosphate. The results of these runs are shown in the table below showing check runs under the same conditions for each of the catalysts used:

| Run No. | 1 | 2 | 3 | 4 | 5 |
|---|---|---|---|---|---|
| Type of Tricresyl Prosphate | Meta-Para | Meta-Para | Ortho | Ortho | Ortho |
| Olefin, Conversion, Percent | 80.4 | 78.7 | 77.5 | 78.4 | 80.2 |
| Selectivity,[1] Percent | 95.5 | 98.0 | 84.6 | 88.0 | 90.4 |
| Yield,[2] Percent | 76.6 | 77.1 | 65.6 | 69.0 | 72.5 |

[1] To motor gasoline ($C_5$–430° F. boiling range).
[2] Gasoline yield based on olefin feed.

The above data show that the catalyst mixture containing the meta and para tricresyl phosphates gave an average of 96.7% selectivity and 76.9 yield, while the catalyst containing only the ortho isomer, gave an average of about 87.7% selectivity and 69% yield. It is seen that a catalyst containing an ortho isomer-free tricresyl phosphate is considerably superior in selectivity to an acid-ortho-cresyl phosphate catalyst.

EXAMPLE 2

A series of runs were carried out under substantially the same conditions described in Example 1 with the exception that the same catalyst was used in each of the runs. In this series of runs, the olefin feed was used as such in 3 runs, whereas in another run, the olefin feed had admixed with it 35 mol percent noncondensible inerts before being charged to the catalyst. At the end of each run, the catalyst was weighed to determine the gain in weight and thus the amount of hydrocarbon present therein. The results are shown in the following table.

*Effect of adding inerts to polymerization feed*

[Conditions: 295° F.; 0.25 v$_L$/v./hr.; 1 atmosphere pressure; 1 vol. $H_3PO_4$/1 vol. tricresyl phosphate.]

| Run No. | 6 | 7 | 8 | 9 |
|---|---|---|---|---|
| Mole percent of noncondensible inerts [1] | 0 | 0 | 0 | 35 |
| Wt. percent of total polymer left in catalyst | 37 | 40 | 29 | 5 |

[1] Mixture of nitrogen, hydrogen, methane, ethane (do not condense at Dry Ice temperature).

It is seen that the amount of polymer remaining in the catalyst, when maintaining an inert gas in contact therewith, was reduced to about one-sixth to one-eighth of that present in the catalyst when no inert gas was present in the reaction zone.

EXAMPLE 3

A run was carried out using substantially identical olefin feed, catalyst and reaction conditions used in run 5 of Example 1. Olefin feed was continuously introduced into the catalyst for 16 hours, the catalyst was then vacuum stripped to a 520° F. vapor temperature at 5–20 mm. Hg absolute and then the stripped catalyst (containing 4 weight percent free hydrocarbon) was reused. The results of this run are shown below:

| Hours on Stream | Initial | [1] 16 | 34 |
|---|---|---|---|
| Free Hydrocarbons in Catalyst, Wt. percent | 0 | 30 | 15 |
| Olefin Conversion, Vol. percent | 80 | 75 | 80 |

[1] Hydrocarbon in catalyst reduced by vacuum stripping to 4 wt. percent before run continued.

Vacuum stripping is seen to be a practical method for removing hydrocarbon from the catalyst without adversely affecting catalyst activity. After the hydrocarbon content of the catalyst has reached a high level, some reduction in catalyst activity is observed. Removal of at least some of the free hydrocarbon is beneficial.

EXAMPLE 4

As stated, it is useful in the practice of this invention to add controlled amounts of water to the polymerization zone in order to maintain the concentration of the phosphoric acid catalyst at a constant level during the polymerization. Addition of water also controls the selectivity of the reaction and serves to regulate the percentage of feed converted to high boiling hydrocarbons. The effect of catalyst concentration is demonstrated by the data of the following table.

*Observations on spent phosphoric acid and phosphoric acid-triaryl phosphate catalysts used for the polymerization of $C_3$-$C_4$ olefins*

[Conditions: $C_3$-$C_4$ feed rate, 0.25 v./hr./v.; 293° F.; pressure, atm.; time, 4¾ hrs.]

| Catalyst | 100% $H_3PO_4$ | 100% $H_3PO_4$+ TOCP | 110% $H_3PO_4$ | 110% $H_3PO_4$+ TOCP |
|---|---|---|---|---|
| Catalyst gain in wt., g | 9.5 | 25 | 12 | 41 |
| Wt. Percent on Feed | 9.0 | 23 | 10 | 36 |
| Hydrocarbon separated by gravitation, g | 2.8 | | 4.0 | |
| Wt. Percent on Feed | 2.7 | | 3.6 | |
| Hydrocarbon separated by vacuum stripping, g | | ¹ 14 | ² 1 | ³ 15 |
| Boiling Range, ° F | | 212–385 | | 203–452 |
| Wt. Percent on Feed | | 13 | 1 | 13 |
| Hydrocarbon in Acid, g | ⁴ 6.5 | ⁵ 11 | ⁴ 7 | ⁵ 26 |
| Wt. Percent on Feed | 6.2 | 10 | 6 | 23 |

¹ 6.7 g. (155° C. @ 58.5 mm.)+7.6 g. (170° C. @ 40 mm.).
² 153° C. @ 7 mm.
³ 155° C. @ 10 mm.
⁴ Probably chemically combined with the acid.
⁵ Portion present as aromatic layer and portion probably chemically combined with the acid.

This data shows the desirability of injecting small amounts of water with the feed gas to compensate for loss of water from the catalyst normally occurring with a dry feed gas.

In general, it is desired to conduct a polymerization operation of the type described under conditions such that the concentration of contaminants in the catalyst will be maintained at a substantially constant, low level. Although hydrocarbon concentrations in the catalyst may, for some purposes, be as high as 20 to 25%, for example, for satisfactory results, it is generally preferred that they do not exceed about 10%, based on the total catalyst mixture. It will be obvious that the objectives of the present invention may be achieved in a number of ways, and it is not intended to be limited to the specific examples and methods disclosed herein.

What is claimed is:

1. In a process for polymerizing olefins in which an olefin is contacted at polymerization conditions with a catalyst comprising an intimate liquid mixture of an organic ester of an inorganic acid of phosphorus, said ester containing at least one aromatic substituent group, and an inorganic acid of phosphorus, and in which process hydrocarbons contaminate the catalyst after prolonged periods of operation under normal conditions, the improvement which comprises maintaining during said polymerization operation the free hydrocarbon content of the catalyst at a level less than about 20% of the total catalyst.

2. A process as in claim 1 wherein 5 to 50% by weight of a free inert gas based on hydrocarbon feed is maintained in intimate contact with said catalyst during at least a portion of the polymerization step.

3. A process as in claim 1 wherein at least a portion of the hydrocarbon contaminated catalyst is replaced with catalyst containing substantially less contamination than said contaminated catalyst during the polymerization step.

4. In a process for polymerizing olefins in which an olefin is contacted under polymerization conditions with a liquid catalyst mixture of an organic aromatic phosphate ester and an inorganic phosphoric acid, and in which contaminating hydrocarbons including polymer become concentrated in the catalyst, the improvement which comprises removing at least a portion of the hydrocarbons from said catalyst during the polymerization step.

5. A process as in claim 4 which comprises removing at least a portion of the contaminated catalyst from the reaction zone, removing a substantial portion of the contaminating hydrocarbon from the catalyst, and returning the substantially decontaminated catalyst to the reaction zone.

6. A process as in claim 5 wherein said removed catalyst is heat-treated at a temperature of from about 150° to 550° F. for the removal of said contaminating hydrocarbons.

7. A process as in claim 4 wherein said hydrocarbon is removed from said contaminated catalyst by contacting same with about 5 to 50% by weight, based on hydrocarbon feed, of an inert gas at an elevated temperature.

8. A process as in claim 4 wherein said ester is tricresyl phosphate that is substantially free of the ortho isomer.

9. In a process for polymerizing olefins in which an olefin is contacted with a catalyst containing an inorganic acid of phosphorus and an organic aromatic phosphate compound under polymerization conditions, the improvement which comprises maintaining about 5 to 50% by weight, based on hydrocarbon feed, of a free inert gas in intimate contact with said catalyst during the polymerization step.

10. A process for polymerizing olefins in the presence of a catalyst comprising an inorganic phosphoric acid and an organic aromatic phosphate compound which comprises withdrawing at least a portion of said catalyst from a polymerization zone, subjecting at least a portion of the withdrawn catalyst to a reduced pressure distillation operation to remove contaminating hydrocarbon therefrom and returning the stripped catalyst to said polymerization zone.

11. In a process of polymerizing normally gaseous olefins in the presence of a catalyst comprising a mixture of an inorganic phosphoric acid and an organic aromatic phosphate compound wherein a normally liquid polymer is recovered therefrom, the improvement for maintaining the content of hydrocarbon in the catalyst at a low level which comprises including a substantial portion of inert gas in the olefin feed.

References Cited in the file of this patent

UNITED STATES PATENTS 2,620,361     Karchmer     Dec. 2, 1952

FOREIGN PATENTS 340,513     Great Britain     Dec. 22, 1930
450,592     Great Britain     July 20, 1936